(12) United States Patent
Peacock Gallagher

(10) Patent No.: US 12,004,487 B2
(45) Date of Patent: Jun. 11, 2024

(54) ANIMAL SAFETY CONSTRAINT SYSTEM

(71) Applicant: Gayle Peacock Gallagher, Jacksonville, FL (US)

(72) Inventor: Gayle Peacock Gallagher, Jacksonville, FL (US)

( * ) Notice: Subject to any disclaimer, the term of this patent is extended or adjusted under 35 U.S.C. 154(b) by 88 days.

(21) Appl. No.: 17/673,631

(22) Filed: Feb. 16, 2022

(65) Prior Publication Data

US 2022/0167590 A1  Jun. 2, 2022

Related U.S. Application Data

(63) Continuation-in-part of application No. 16/265,901, filed on Feb. 1, 2019, now abandoned.

(60) Provisional application No. 62/625,925, filed on Feb. 2, 2018.

(51) Int. Cl.
  *A01K 15/04* (2006.01)
  *A61D 3/00* (2006.01)

(52) U.S. Cl.
  CPC ............. *A01K 15/04* (2013.01); *A61D 3/00* (2013.01); *A61D 2003/003* (2013.01)

(58) Field of Classification Search
  CPC .... A01K 15/04; A61D 3/00; A61D 2003/003; F16B 39/32; F16B 2/10
  USPC ....................................................... 119/722
  See application file for complete search history.

(56) References Cited

U.S. PATENT DOCUMENTS

| | | | | | |
|---|---|---|---|---|---|
| 1,401,393 | A | * | 12/1921 | Cross | A61D 3/00 119/755 |
| 1,759,970 | A | * | 5/1930 | Welk | A61D 3/00 119/806 |
| 1,895,156 | A | * | 1/1933 | Fisher | B01L 9/50 81/118 |
| 2,804,845 | A | * | 9/1957 | Plumley | A61D 3/00 119/756 |
| 2,956,542 | A | * | 10/1960 | Mueller | A01K 15/04 24/DIG. 47 |
| 3,120,836 | A | * | 2/1964 | Brauning | A61D 3/00 269/329 |
| 3,147,993 | A | * | 9/1964 | Broderson | B66F 9/18 414/23 |
| 3,208,432 | A | * | 9/1965 | Fisk | A61D 3/00 312/298 |
| 3,250,252 | A | * | 5/1966 | Leopold | A01K 1/0613 119/756 |
| 3,524,434 | A | * | 8/1970 | Finley | A61D 3/00 119/756 |
| 3,540,417 | A | * | 11/1970 | Mark | A01K 15/006 D30/152 |

(Continued)

*Primary Examiner* — Brady W Frazier
*Assistant Examiner* — Zoe Tam Tran
(74) *Attorney, Agent, or Firm* — Wilson Dutra, PLLC; Camille A. Wilson

(57) ABSTRACT

The present disclosure provides generally for an improved system to constrain animals. More specifically, the present disclosure describes an animal safety constraint system that may be used to safely and securely restrain animals, such as for grooming, veterinary inspection, or shearing, as non-limiting examples. The animal safety constraint system may be customized according to the needs of the user or the occupant. The animal safety constraint system may be mobile or stationary, depending on the configuration the user sets up for the animal safety constraint system.

19 Claims, 13 Drawing Sheets

(56) References Cited

U.S. PATENT DOCUMENTS

| | | | | |
|---|---|---|---|---|
| 4,413,588 | A | * | 11/1983 | Lindholm .............. A01K 15/04 119/863 |
| 5,334,354 | A | * | 8/1994 | Johnston .................. B01L 9/50 16/376 |
| D870,548 | S | * | 12/2019 | Modracek .................... D24/224 |
| 2009/0133609 | A1 | * | 5/2009 | Nethken ................ A47B 21/02 108/50.02 |
| 2011/0061606 | A1 | * | 3/2011 | Sevadjian .............. A01K 13/00 119/756 |
| 2013/0014706 | A1 | * | 1/2013 | Menkes ................... A61B 5/72 119/859 |
| 2014/0299313 | A1 | * | 10/2014 | Messmer ................. F16B 2/10 166/77.51 |
| 2016/0066541 | A1 | * | 3/2016 | Storum ................. A01K 15/04 119/756 |
| 2018/0368369 | A1 | * | 12/2018 | Greene ................ A01K 27/001 |
| 2020/0063769 | A1 | * | 2/2020 | King ....................... B25F 1/003 |

* cited by examiner

ANIMAL SAFETY CONSTRAINT SYSTEM

CROSS-REFERENCE TO RELATED APPLICATION

This application is a continuation in part of U.S. Non-provisional patent application Ser. No. 16/265,901, filed Feb. 1, 2019, and titled "ANIMAL SAFETY CONSTRAINT SYSTEM", which claimed priority to and the full benefit of U.S. Provisional Patent Application Ser. No. 62/625,925, filed Feb. 2, 2018, and titled "ANIMAL SAFETY CONSTRAINT SYSTEM", the entire contents of which are incorporated in this application by reference.

BACKGROUND OF THE DISCLOSURE

, when veterinarians examine an excited or aggressive pet, they employ one of three methods to protect themselves, their assistants, and the animal: physical restraint by two or more people; drugs to sedate the animal; or tying the animal off at three points using leashes around the animal's neck. Drugs can immobilize the animal for complete safety, but the other two methods leave both the animal and the handlers at risk for injury. Meanwhile, repeatedly using drugs to sedate an animal may have long-term effects on the animal's health.

In the grooming field, practitioners secure the pet with a noose that goes around the pet's neck and attaches to an overhead arm. When a pet is excited or aggressive and will not stand still on the grooming table, groomers often use sedatives as a means of control, which may be dangerous. The only exception might be if the sedatives were prescribed by a vet for the grooming session. If a groomer overuses sedatives, animals may die through overdosing on the sedatives that a groomer gives to them or from getting drowsy and falling off of the grooming table. When the dog is relaxed from the sedative, it can cause the noose to tighten around the dog's neck and result in strangulation and death. Falling off a table is particularly common if a groomer leaves a room or an animal is left unsupervised. If an animal does not die from the strangulation, it may leave serious brain damage.

Another dangerous grooming method is used for shearing alpacas. Currently, alpaca farmers use ropes to tie down the alpacas or strap them to a table. Shearing alpacas involves different methods of "dropping" an alpaca to the ground. This involves wrestling the animal to the ground. A second method currently used is a technique known as "chukkering." This system involves leading the alpaca to a designated area with the restraint ropes already in place and manhandling the alpaca into position. Once the alpaca is on the ground, it must be stretched into the proper position for shearing by tightening the ropes and holding the alpaca's legs in place. This set up is sloppy, rough, and causes panic in the alpaca.

The current tools used to assist in grooming and shearing animals can lead to stress, severe injuries, or death. Despite the potential harm that can happen during these processes, there is still a need to have pets vetted and groomed and to shear alpacas and llamas. The current procedures for holding these animals in place are dangerous and outdated.

SUMMARY OF THE DISCLOSURE

What is needed is an animal safety constraint system to secure animals during routine vetting, grooming, check-up, maintenance, or shearing procedures. This animal safety constraint system may have multiple points of contact to secure an animal. In some embodiments, the animal safety constraint system may be customized for a particular animal, such as an alpaca or a dachshund. In some implementations, the animal safety constraint system may include quality of life functionality or improvements for either the user or the occupant.

In some aspects, the animal safety constraint system may be mobile or affixed to a location. In some embodiments, the animal safety constraint system may be expandable with additional parts to add to its functionality or to serve a particular situation. For example, the animal safety constraint system may have a removable body portion that can be fitted according to the needs of the animal that is using the animal safety constraint system. A Siberian Husky, a Bichon Frise, a mixed breed, and a Huacaya alpaca, for example, may each require different stabilizers to hold their bodies.

The present disclosure relates to an animal safety constraint system comprising a neck clamp configured to accept a neck of an animal; a neck clamp arm connected to the neck clamp and connectable to a base surface, wherein the base surface is configured to provide a platform for the animal; a torso support pad configured to accept a torso of the animal; and a torso support arm connected to the torso support pad and connectable to the base surface, wherein the neck clamp and the torso support pad are configured to safely constrain the animal within the animal safety constraint system to stay on the base surface.

In some aspects, one or both the neck clamp and the torso support pad may be lined with a soft material configured to increase comfort for the animal when constrained within the animal safety constraint system. In some embodiments, one or both the neck clamp and the torso support pad comprises at least one biofeedback sensor. In some implementations, the neck clamp may comprise a plurality of arc portions, wherein a combination of at least two of the arc portions may be configured to wrap around the neck of the animal, securing the neck of the animal within the animal safety constraint system.

In some embodiments, the neck clamp arm may comprise an angle adjustment mechanism configured to allow for control over one or both an angle of extension within the neck clamp arm or an angle of extension from the neck clamp arm and the neck clamp. In some implementations, the animal safety constraint system may comprise a neck clamp surface mount configured to connect the neck clamp arm to the base surface. In some aspects, the neck clamp surface mount may comprise a first adjusting mechanism adjustable to accommodate a predefined range of animal sizes. In some embodiments, the first adjusting mechanism may be electronically adjustable.

In some embodiments, the animal safety constraint system may comprise a torso support surface mount configured to connect the neck clamp arm to the base surface. In some aspects, the torso support surface mount may comprise a second adjusting mechanism adjustable to accommodate a predefined range of animal sizes. In some implementations, the second adjusting mechanism may be electronically adjustable. In some embodiments, the animal safety constraint system may comprise one or more safety release mechanisms configured to release the animal constrained within the animal safety constraint system, wherein the releasing is based on one or more threshold activities. In some embodiments, at least one of the one or more threshold activities may comprise the animal slipping or falling off the base surface. In some aspects, at least one of the one or more safety release mechanisms may release the neck clamp.

The present disclosure relates to an animal safety constraint system comprising a base surface configured to provide a platform for an animal; a neck clamp configured to accept a neck of the animal; a neck clamp arm connected to the neck clamp and connectable to the base surface; a torso support pad configured to accept a torso of the animal; and a torso support arm connected to the torso support pad and connectable to the base surface, wherein the neck clamp and the torso support pad are configured to safely constrain the animal within the animal safety constraint system to stay on the base surface.

In some implementations, the animal safety constraint system may comprise one or more safety release mechanisms configured to release the animal constrained within the animal safety constraint system, wherein the releasing is based on one or more threshold activities. In some aspects, at least one of the one or more safety release mechanisms releases the neck clamp.

The present disclosure relates to an animal safety constraint system comprising a neck clamp arm connectable to a base surface, wherein the base surface is configured to provide a platform for an animal; and a neck clamp connected to the neck clamp arm and configured to accept a neck of the animal, wherein the neck clamp comprises a plurality of arc portions, wherein a combination of at least two of the arc portions is configured to wrap around the neck of the animal, wherein wrapping secures the neck of the animal within the animal safety constraint system and safely constrains the animal to stay on the base surface.

In some aspects, the animal safety constraint system may comprise one or more safety release mechanisms configured to release the animal constrained within the animal safety constraint system, wherein the releasing is based on one or more threshold activities. In some embodiments, one or both the neck clamp arm and the neck clamp may be adjustable to accommodate a predefined range of animal sizes.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure.

DETAILED DESCRIPTION

The present disclosure provides generally for an improved system to constrain animals. More specifically, the present disclosure describes an animal safety constraint system that may be used to safely and securely restrain animals, such as for grooming, veterinary inspection, or shearing, as non-limiting examples. The animal safety constraint system may be customized according to the needs of the user or the occupant. The animal safety constraint system may be mobile or stationary, depending on the configuration the user sets up for the animal safety constraint system.

In the following sections, detailed descriptions of examples and methods of the disclosure will be given. The description of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

Animal Safety Constraint System: as used herein refers to a system that may safely and securely restrain an animal with limited support or human involvement required for continued restraint.

Neck Clamp: as used herein refers to a portion of an animal safety constraint system that may one or both restrain or support a neck region of an animal. In some embodiments, a neck clamp may comprise a clamping mechanism that may close around a neck region of an animal, though other securing mechanisms may be integrated.

Torso Support Pad: as used herein refers to a portion of an animal safety constraint system that may one or both restrain or support a torso region of an animal. In some aspects, a torso support pad may comprise a pad that may fit under the torso region of an animal, which may comfortably encourage an animal to stay calm while restrained by the neck clamp. In some implementations, a torso support pad may comprise a clamping mechanism that may close around a portion of the torso region of an animal, which may supplement the security of the neck clamp.

Figure 1:
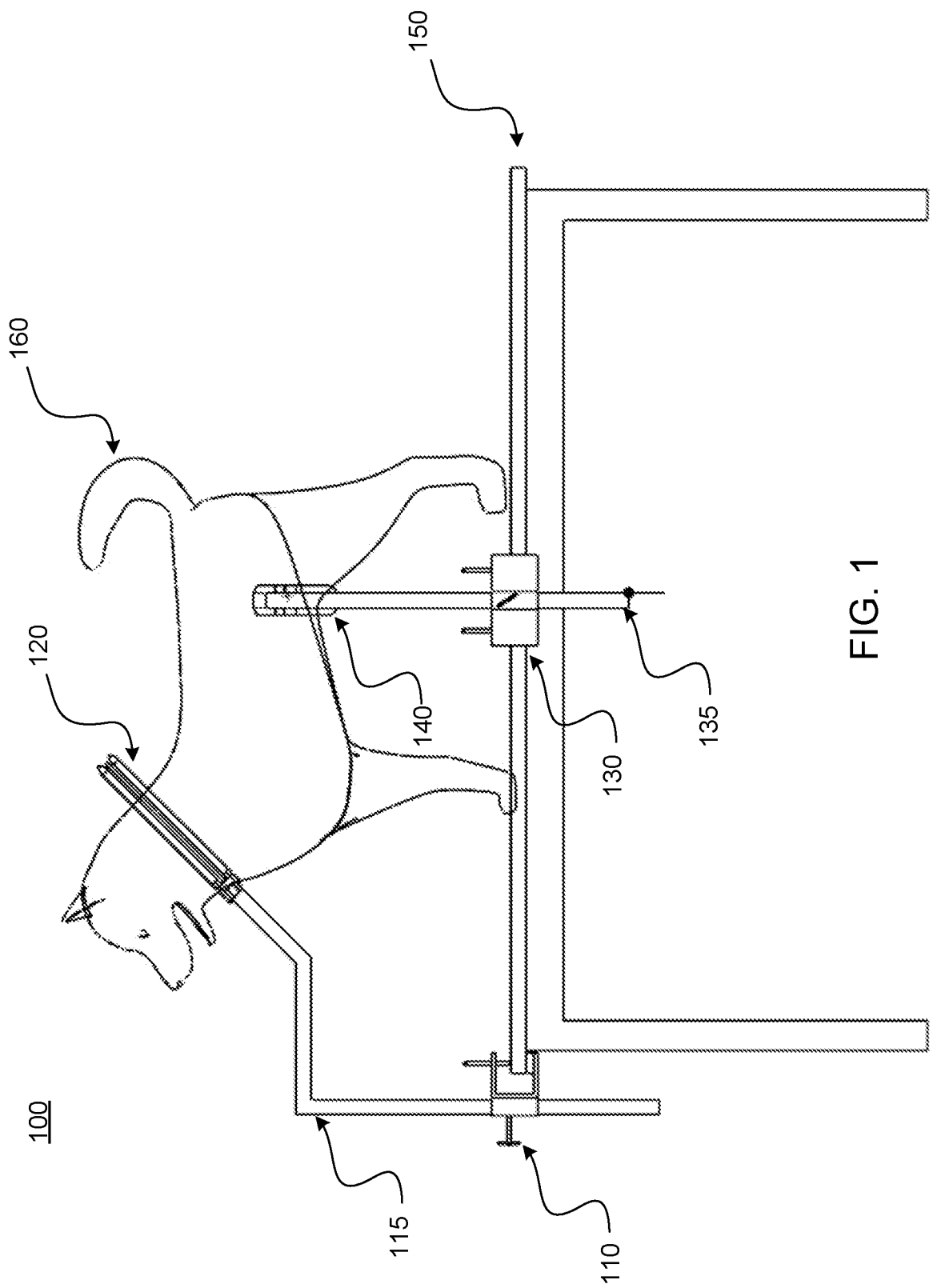
FIG. 1 illustrates a perspective view of an exemplary animal safety constraint system safely restraining a dog, according to some embodiments of the present disclosure.

Referring now to FIG. 1, a side view of an exemplary animal safety constraint system 100 is illustrated. In some aspects, an animal safety constraint system 100 may comprise a neck clamp 120 and a torso support pad 140, wherein a dog 160 may be placed on a base surface 150 and safely restrained by the neck clamp 120 and torso support pad 140. In some embodiments, the neck clamp 120 may be secured to the base surface 150 through a neck clamp arm 115, which may be anchored to the base surface 150 by a neck clamp surface mount 110. In some implementations, the torso support pad 140 may be secure to the base surface 150 through a torso support arm 135, which may be anchored to the base surface 150 by a torso support surface mount 130. In some aspects, a base surface may be configured to provide a platform for the animal.

In some aspects, one or both the torso support pad 135 and the neck clamp 120 may be lined with a soft material, which may allow for comfortable contact with the body of an animal. As non-limiting examples, the material may comprise surgical tubing, silicone rubber, fabric, or a foam. In some embodiments, one or both the torso support pad 135 and the neck clamp 120 may comprise a material that may safely and comfortably limit slipping, such as a textured surface or material. For example, a soft rubber may be comfortable against an animal's skin and a textured surface may comfortably cause friction with the animal's coat, limiting unintentional slippage or discomfort.

In some embodiments, one or both the neck clamp 120 and the torso support pad 135 may comprise interchangeable options, wherein different neck clamps 120 or torso support pads 135 may be customized based on the needs and preferences of the animal and user. For example, a comfortable neck clamp 120 may be different for long haired animals, such as an Afghan Hound or Bichon Frise, short haired animals, such as a Beagle or Dalmatian, or hairless animals, such as a Sphynx cat or Chinese Crested dog. In some embodiments, the neck clamp 120 mechanism may vary based on the strength or anxiety levels of the animal. For example, an anxious, young, and active Doberman Pinscher may require a sturdier neck clamp 120 mechanism than a calm, elderly Pomeranian.

In some aspects, a replaceable sleeve for one or both the neck clamp 120 and the torso support pad 135 may allow for easy cleaning between animals. In some embodiments, the replaceable sleeve may be disposable or washable. In some implementations, the base surface 150 may comprise a replaceable liner, which may allow for easy cleaning between animals.

In some implementations, one or both the neck clamp arm 115 and the torso support arm 135 may comprise a safe, rigid material, such as steel, stainless steel, aluminum, plastic, acrylic, or polymer, as non-limiting examples. In some embodiments, the material may be at least partially dictated by the application of the animal safety constrain system 100. For example, a veterinary facility may prefer surgical grade material, which may provide the most sanitary options, and a groomer may prefer rustproof material as many animals may be wet when placed in the animal safety constraint system 100. For example, the animal safety constraint system 100 may be used in a bathing tub.

Figure 2:
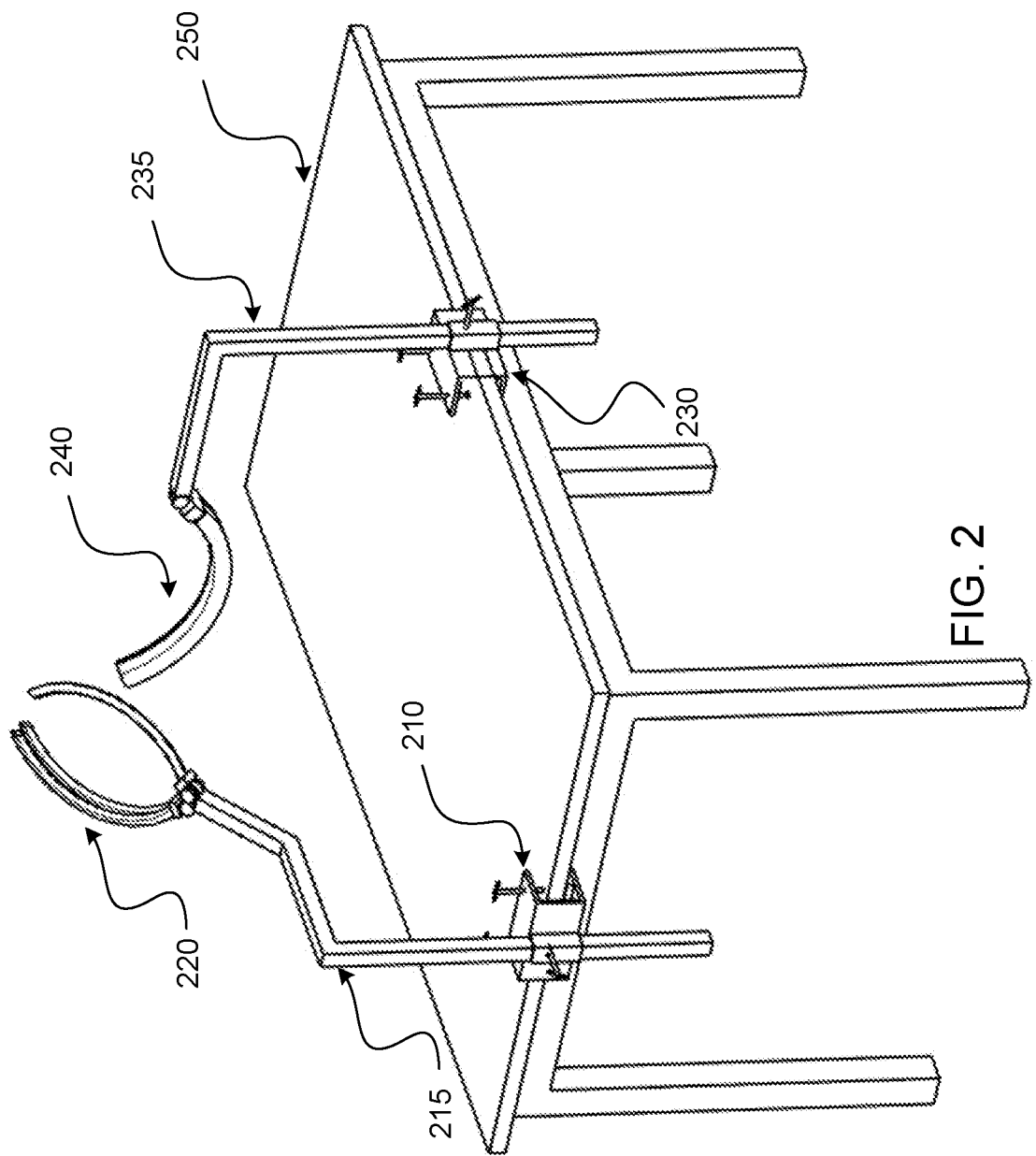
FIG. 2 illustrates a perspective view of an exemplary animal safety constraint system, according to some embodiments of the present disclosure.

Referring now to FIG. 2, an exemplary animal safety constraint system 200 is illustrated. In some aspects, an animal safety constraint system 200 may comprise a neck clamp 220 and a torso support pad 240, wherein an animal may be placed on a base surface 250 and safely restrained by the neck clamp 220 and torso support pad 240. In some embodiments, the neck clamp 220 may be secured to the base surface 250 through a neck clamp arm 215, which may be anchored to the base surface 250 by a neck clamp surface mount 210. In some implementations, the torso support pad 240 may be secure to the base surface 250 through a torso support arm 235, which may be anchored to the base surface 250 by a torso support surface mount 230.

In some aspects, one or both the neck clamp surface mount 210 and the torso support surface mount 230 may comprise an adjusting mechanism, which may allow the animal safety constraint system 200 to accommodate a range of animal sizes. In some implementations, the adjusting mechanism may comprise a clamp with screw, which may allow a user to control the placement of one or both the neck clamp surface mount 210 and the torso support surface mount 230 on the base surface 250. In some embodiments, the adjustment mechanism may further allow control of the height of one or both the neck clamp surface mount 210 and the torso support surface mount 230.

In some embodiments, the adjusting mechanism may comprise a spring, slide, or ratcheting mechanism, which may allow a user to toggle the height of one or both the neck clamp arm 215 or the torso support arm 235. In some implementations, the adjusting mechanism may be electronic, wherein the heights may be electronically controlled, such as by a controller that may be wireless or connected to the animal safety constraint system 200.

In some aspects, the adjustment mechanism may comprise a metal, such as steel, stainless steel, bronze, brass, or aluminum, as non-limiting examples. In some implementations, the metal may be coated to increase the longevity of the adjustment mechanism, such as through zinc plating, hot dip galvanizing, chrome, plastic, or paint, as non-limiting examples. In some embodiments, the neck clamp arm 215 may comprise an angle adjustment mechanism, which may allow for control over one or both the angle of extension within the neck clamp arm 215 or the angle of extension from the neck clamp arm 215 and the neck clamp 220.

Figure 3:
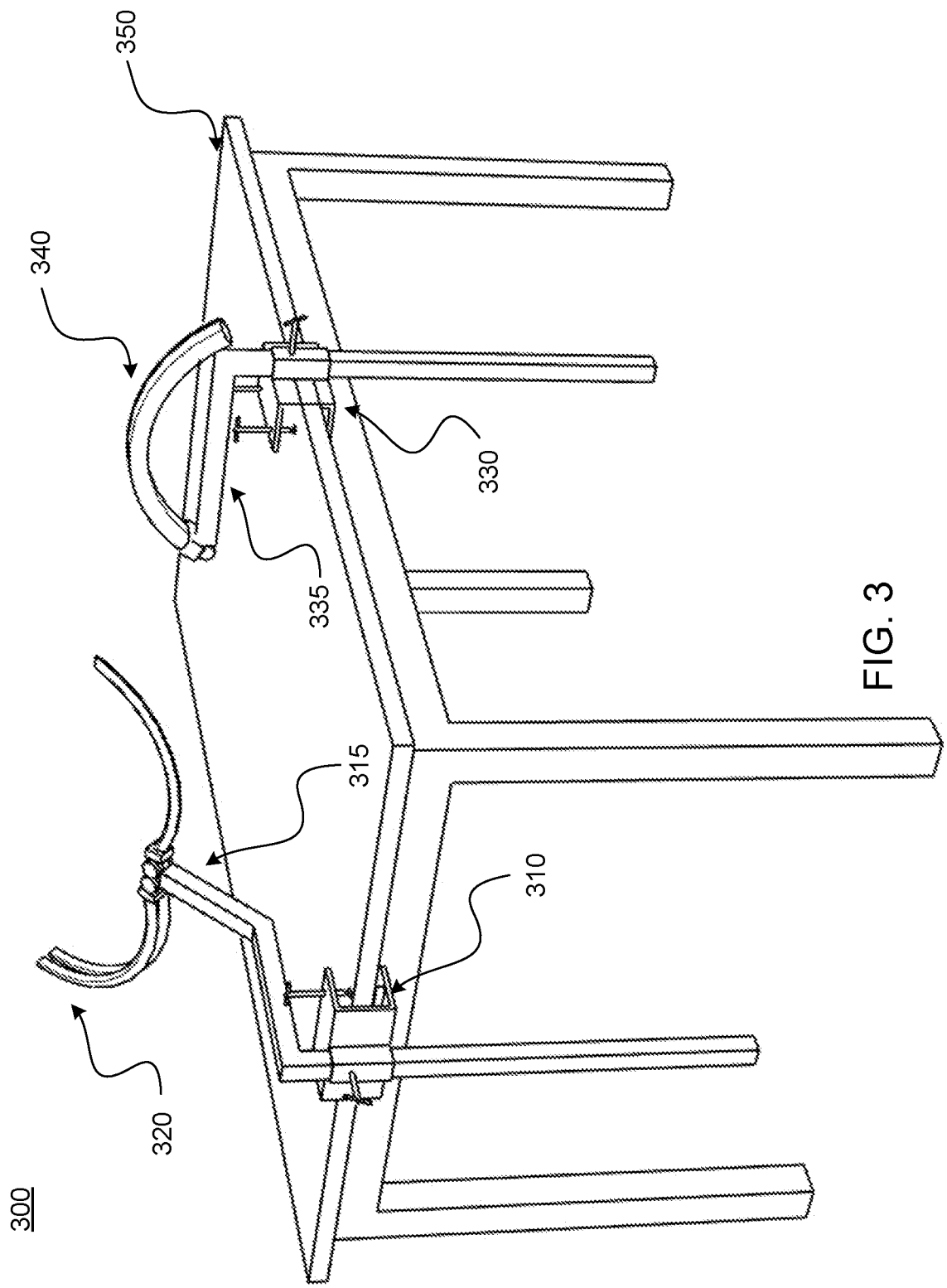
FIG. 3 illustrates a perspective view of an exemplary animal safety constraint system, according to some embodiments of the present disclosure.

Referring now to FIG. 3, an exemplary animal safety constraint system 300 is illustrated. In some aspects, an animal safety constraint system 300 may comprise a neck clamp 320 and a torso support pad 340, wherein an animal may be placed on a base surface 350 and safely restrained by the neck clamp 320 and torso support pad 340. In some embodiments, the neck clamp 320 may be secured to the base surface 350 through a neck clamp arm 315, which may be anchored to the base surface 350 by a neck clamp surface mount 310. In some implementations, the torso support pad 340 may be secure to the base surface 350 through a torso support arm 335, which may be anchored to the base surface 350 by a torso support surface mount 330.

In some aspects, one or both the neck clamp 320 and the torso support pad 340 may comprise an adjusting mechanism, which may allow for control over the placement of the neck clamp 320 and the torso support pad 340. In some embodiments, at least a portion of the adjusting mechanism may comprise a stainless steel, tool steel, chrome vanadium, chrome molybdenum, or aluminum, as non-limiting examples. In some implementations, the adjusting mechanism may allow for control of the torso support pad 340 relative to the torso support pad arm 335. For example, the adjusting mechanism may allow for general open orientation that may accept an animal or stored orientation when the animal safety constraint system 300 may not be in use.

In some aspects, the neck clamp 320 may comprise two securing arms with the ability for simultaneous travel of both securing arms through the physical manipulation of both arms. In some aspects, the neck clamp 320 may comprise a safety release mechanism that may return one or both arms to the original, released position through a single mechanical release. In some embodiments, the neck clamp 320 may be mechanical, wherein physical movement of one or both arms through applied force may result in an inward motion of both arms.

In some aspects, the neck clamp 320 may be locked within a predefined extension range, wherein the arms may not be moved out to the original position without the mechanical actuation of the safety release mechanism. In some implementations, the animal safety constraint system 300 may allow for the use of a variety of dog sizes, there may be a chance for over-closure on the neck of the animal. The animal safety constraint system 300 may comprise a force-limiting safety feature to help prevent over-closure on the neck of the animal or over-forcing on the neck of the animal. In some aspects, once the animal safety constraint system 300 is in position, the neck clamp 320 may be limited in extension, wherein the arms may be prevented from moving backwards, unless the safety release mechanism is engaged.

In some implementations, the adjusting mechanism may allow for control of the neck clamp 320 relative to one or both an animal and the neck clamp arm 315. In some aspects, the adjusting mechanism may allow a user to adjust the angle of extension between the neck clamp 320 and the neck clamp arm 315. In some embodiments, the adjusting mechanism may allow a user to adjust the portions of the neck clamp around the neck portion of an animal. For example, a neck clamp 320 may comprise two portions, which may be fitted around the neck of an animal. A first portion may comprise a single appendage in the shape of a portion of an arc, and the second portion may comprise dual appendages in the shape of a portion of an arc, wherein the first portion may fit into the second portion.

In some embodiments, a neck clamp 320 may comprise multiple pieces for one or more enhanced safety, security, control, or comfort. Typical restraining mechanisms used today utilize a single looped material that may cinch and tighten around an animal's neck, which may cause harm or even death to the animal. In some aspects, an animal safety constrain system 300 may comprise one or more safety release mechanisms, which may engage based on threshold activity. As non-limiting examples, threshold activities may include an animal slipping off the base surface 350, an animal failing to relax, wherein continued neck clamping may cause further panic, or tightening of a neck clamp 320 beyond the comfort level of an animal.

In some aspects, a neck clamp 320 may comprise one or more safety mechanisms, which may be automatic or user controlled. For example, a neck clamp 320 may comprise a safety release mechanism that a user may engage if they would like to quick release an animal. As another example, a neck clamp 320 may comprise an automatic safety release mechanism, which may automatically release an animal based on predefined threshold criteria, such as tension levels when the neck clamp 320 is wrapped around an animal or lateral motion from a jerking animal attempting to release itself from the animal safety constrain system 300.

In some aspects, the thresholds to trigger the safety release mechanism may be based on symptoms or triggers associated with anxiety or other disorders that may put the animal in danger or discomfort. For example, a tight-fitting neck clamp 320 may trigger anxiety in an animal, and the safety release mechanism may release based on a threshold tightness. As another example, an epileptic seizure may be associated with jerking movements and loss of consciousness, and the safety release mechanism may release based on threshold movement patterns, suddenness of motion, or direction of pulling, as non-limiting examples.

In some embodiments, the animal safety constraint system 300 may comprise a home version, which may be portable. In some aspects, a home version may allow for collapse and storage of the animal safety constraint system 300. In some aspects, a home version may comprise interchangeable base surfaces 350, which may allow for greater flexibility. For example, the base surface options may include a version for use within a bathtub, on a counter, or on the ground.

In some embodiments, the base surface 350 may be removable, wherein one or both the neck clamp arm 315 and the torso support arm 335 may be attached to nearby surfaces, such as a bathtub wall or counter ledge. In some aspects, the base surface 350 may not need to be anchored to a secondary surface, such as a table or ground, and the weight of the animal may be sufficient to stabilize the animal safety constraint system 300. In some embodiments, home versions may be available in different base sizes, similar to collars or kennels, which may allow a user to select the size best suited for their animal. For example, a toy poodle owner may not want or need an animal safety constraint system 300 that could also accommodate a Rottweiler or Weimaraner, and similarly, a German Shepherd owner may not want or need an animal safety constraint system 300 that could also accommodate a pug.

In some implementations, a home version may be configured to be placed within a bathtub or shower. For example, the base surface 350 may comprise a mat that may be placed on the floor of a bathtub or shower. The base surface 350 may comprise a semi-permeable surface, such as holes, to allow for draining during bathing. The base surface 350 may comprise a stabilizing mechanism, such as suction cups to limit slippage of the base surface 350 within the bathtub or shower.

Figure 4A:
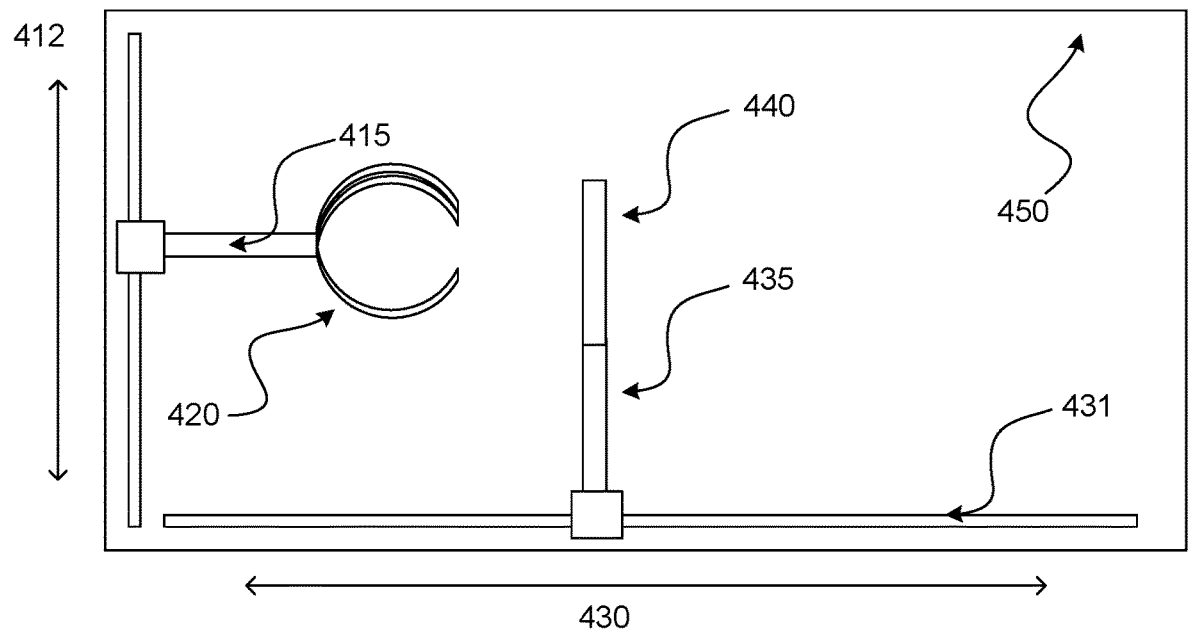
FIG. 4A illustrates a top down view of an exemplary animal safety constraint system, according to some embodiments of the present disclosure.
Figure 4B:
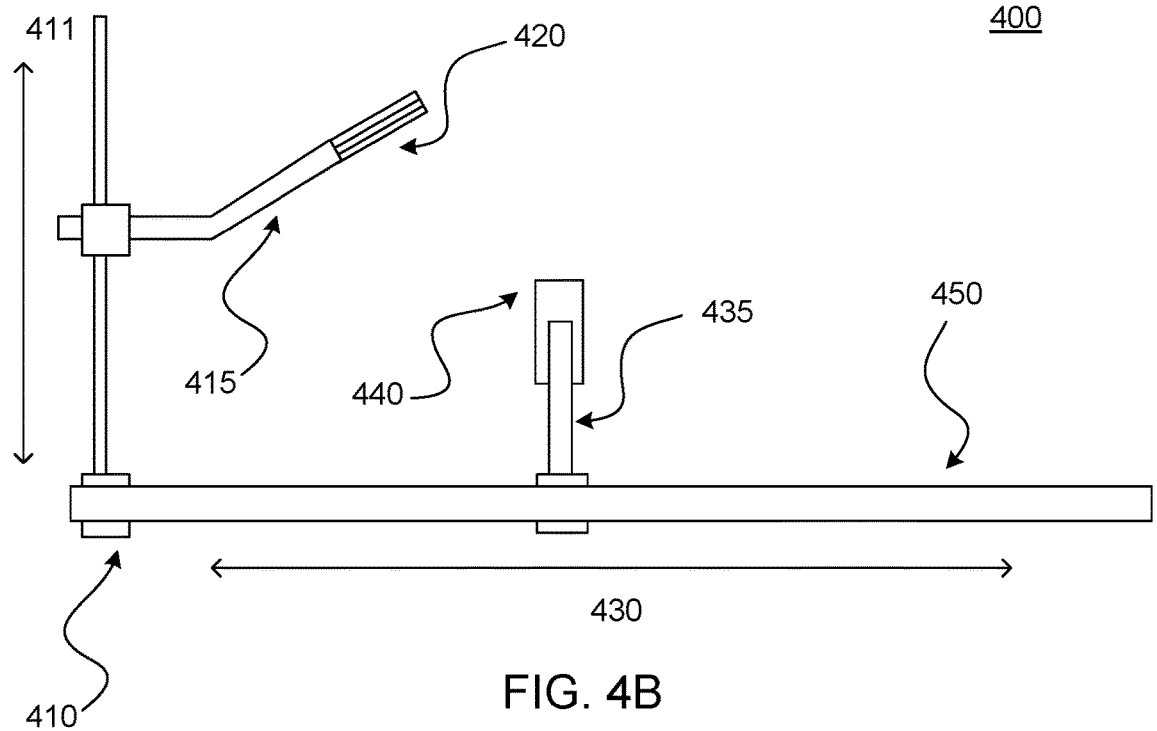
FIG. 4B illustrates a side view of an exemplary animal safety constraint system, according to some embodiments of the present disclosure.

Referring now to FIGS. 4A-4B, an exemplary animal safety constraint system 400 is illustrated. In some aspects, an animal safety constraint system 400 may comprise a neck clamp 420 and a torso support pad 440, wherein a dog may be placed on a base surface 450 and safely restrained by the neck clamp 420 and torso support pad 440. In some embodiments, the neck clamp 420 may be secured to the base surface 450 through a neck clamp arm 415 attached to an arm extender 411, which may be anchored to the base surface 450 by a neck clamp surface mount 410. In some implementations, the torso support pad 440 may be secure to the base surface 450 through a torso support arm 435, which may be anchored to the base surface 450 by a torso support surface mount 430.

In some aspects, the base surface 450 may comprise a neck clamp track 412, wherein an arm extender 411 may be anchored into the neck clamp track 412. In some embodiments, the base surface 450 may comprise a torso support track 431, wherein a torso support arm 435 may be anchored into the torso support track 431. In some implementations, the arm extender 411 may be moved along the neck clamp track 412, and the torso support arm 435 may be moved along the torso support track 431, which may allow for the accommodation of animals within a range of sizes.

Figure 5A:
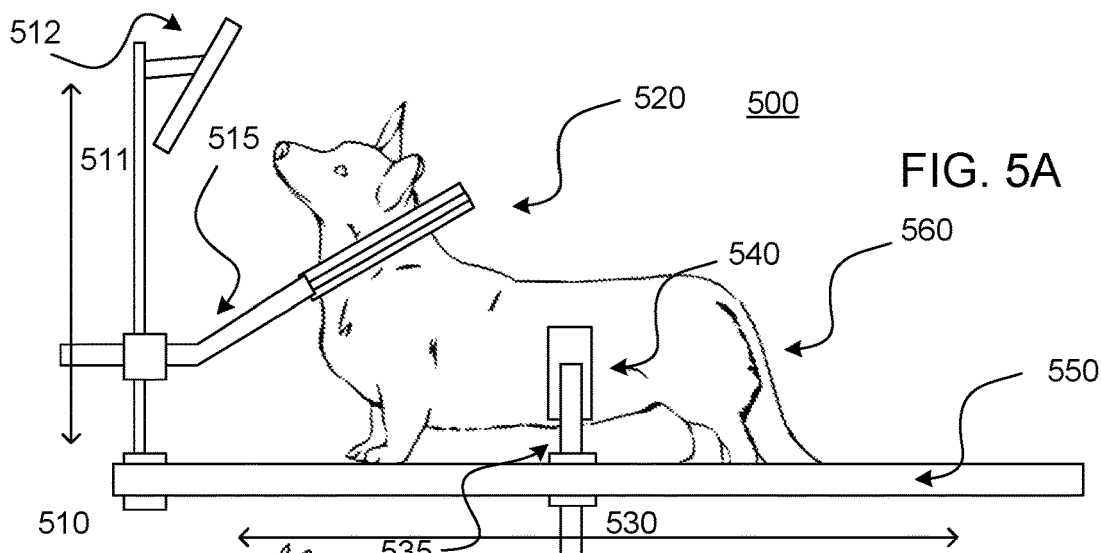
FIG. 5A illustrates a side view of an exemplary animal safety constraint system safely restraining a medium sized dog, according to some embodiments of the present disclosure.
Figure 5B:
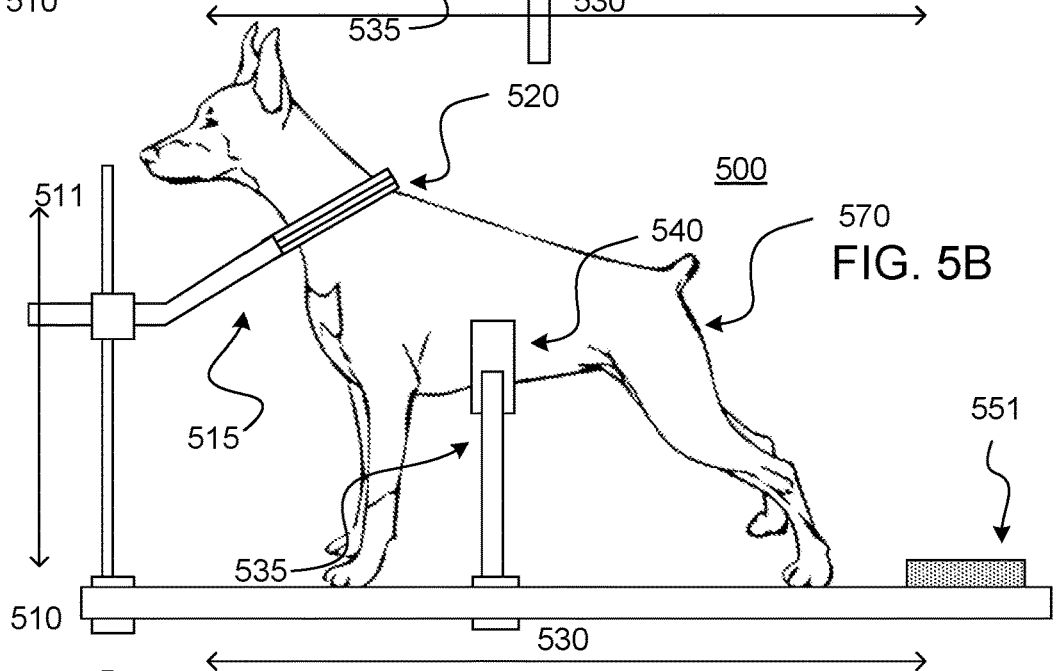
FIG. 5B illustrates a side view of an exemplary animal safety constraint system safely restraining a large sized dog, according to some embodiments of the present disclosure.
Figure 5C:
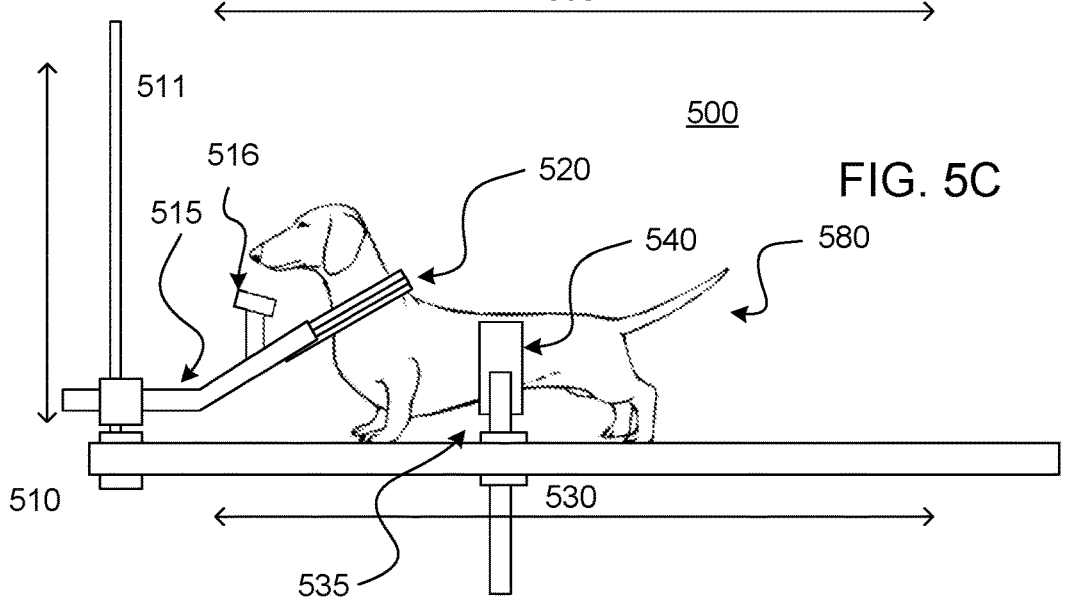
FIG. 5C illustrates a side view of an exemplary animal safety constraint system safely restraining a small sized dog, according to some embodiments of the present disclosure.

Referring now to FIG. 5A-5C, an exemplary animal safety constraint system 500 is illustrated, wherein a range of dog sizes are shown restrained within the animal safety constraint system 500. In some aspects, an animal safety constraint system 500 may comprise a neck clamp 520 and a torso support pad 540, wherein dogs 560, 570, 580 of various sizes may be placed on a base surface 550 and safely restrained by the neck clamp 520 and torso support pad 540. In some embodiments, the neck clamp 520 may be secured to the base surface 550 through a neck clamp arm 515 attached to an arm extender 511, which may be anchored to the base surface 550 by a neck clamp surface mount 510. In some implementations, the torso support pad 540 may be secure to the base surface 550 through a torso support arm 535, which may be anchored to the base surface 550 by a torso support surface mount 530.

In some aspects, such as shown in FIGS. 5A and 5C, the neck clamp arm 515 may be placed low on the arm extender 511 for smaller dogs, allowing for comfortable placement of the neck clamp 520. Similarly, the torso support arm 535 may be lowered into a torso support track, such as illustrated and described in FIG. 4A, for short animals. In some implementations, such as shown in FIG. 5B, the neck clamp arm 515 may be placed higher on the arm extender 511, and the torso support arm 535 may be raised to adjust to the taller height of a larger dog, In some embodiments, the animal safety constraint system 500 may comprise a distraction mechanism, which may aim to capture the attention of a restrained animal. In some aspects, the distraction mechanism may be located in front of the animal, such as attached to the arm extender 511 or neck clamp arm 515. For example, a toy or treat may be located on the arm extender 511 just out of reach of the animal so that the animal may watch the toy or treat instead of focusing on a veterinary inspection or grooming.

In some aspects, the animal safety constraint system 500 may comprise a calming mechanism, which may aim to reduce anxiety levels of a restrained animal. In some implementations, the calming mechanism may be located near the animal, such as on the neck clamp arm 515, torso support pad 540, arm extender 511, neck clamp 520, or on the base surface 550. For example, the calming mechanism may comprise an anxiety-reducing oil that may be rubbed or sprayed on the neck clamp 520 or on a calming pad 516 on the neck clamp arm 515, allowing for focused exposure of the animal to the calming mechanism. As another example, the calming mechanism may comprise a noise machine or other calming device 551 that may be located on the base surface 550. In some aspects, the animal safety constraint system 500 may comprise a screen 512, such as a tablet, that may play one or both calming or distracting media, such as where the screen 512 may be attached to the arm extender 511. In some embodiments, the screen 512 may be adjustable to accommodate a range of animal types and sizes.

In some embodiments, the animal safety constraint system 500 may provide additional functionality based on the particular application. In some aspects, such as where the animal safety constraint system 500 may be used by a veterinary office, portions of the animal safety constraint system 500 may assist in a wellness assessment. In some embodiments, the placement settings of one or more of the torso support pad 540, neck clamp arm 515, neck clamp 520, and torso support arm 535 may provide base information about the animal.

For example, the torso support pad 540 may comprise sensors that may detect or assist with an abdomen check of the animal. As another example, the base surface 550 may comprise a scale that may measure the weight of the animal. As another example, the arm extender 511 may comprise a height measurement mechanism, and the base surface 550 may comprise a length measurement mechanism. As another example, the neck clamp 520 may measure the heart rate of the animal. As another example, the neck clamp 520 may be used to stabilize the animal for a central venus neck catheter.

In some aspects, the animal safety constraint system 500 may be a smart system, wherein information may be input and potentially tracked. In some implementations, animal details, such as name, date of birth, and breed, may be input, and the information assessed while the animal is restrained may be stored and associated with that animal's profile. Over time, the wellness of the animal may be tracked and monitored. For example, a dog may be initially brought in as a puppy, and his wellness may be tracked over his lifespan. In some embodiments, basic details, such as breed and age, may be input, which may allow for a comparative assessment of the wellness of the animal. For example, indicating that an animal is a two-year-old corgi may allow for a comparison of the wellness information gathered about the particular corgi to the average wellness statistics of the breed at that age.

Figure 6:
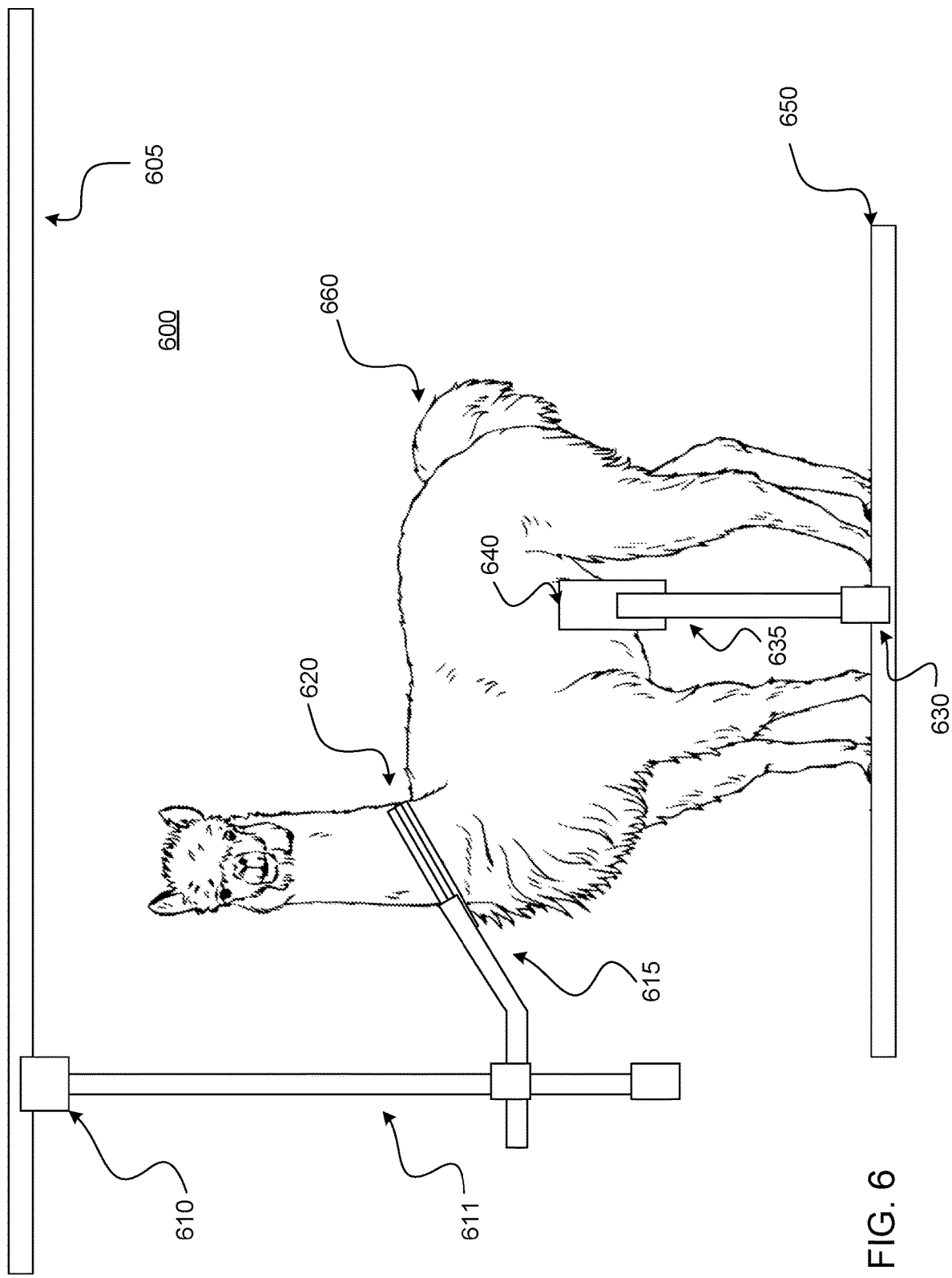
FIG. 6 illustrates a side view of an exemplary animal safety constraint system safely restraining an alpaca, according to some embodiments of the present disclosure.

Referring now to FIG. 6, an exemplary animal safety constraint system 600 is illustrated, wherein the animal safety constraint system 600 may accommodate larger animals. In some aspects, an animal safety constraint system 600 may comprise a neck clamp 620 and a torso support pad 640, wherein a large animal, such as an alpaca 660, may be placed on a base surface 650 and safely restrained by the neck clamp 620 and torso support pad 640. In some embodiments, the neck clamp 620 may be secured to the base surface 650 through a neck clamp arm 615 attached to an arm extender 611, which may be anchored to a second surface 605 by a neck clamp surface mount 610. In some implementations, the torso support pad 640 may be secure to the base surface 650 through a torso support arm 635, which may be anchored to the base surface 650 by a torso support surface mount 630.

In some aspects, the animal safety constraint system 600 may be used for larger animals, such as an alpaca 660, llama, sheep, goat, cow, horse, or zoo animal, as non-limiting examples. In some embodiments, the functionality may be similar to animal safety constraint system for smaller animals, such as illustrated in FIG. 1, wherein the animal safety constraint system 600 may allow for easier and safer veterinary inspection or grooming. In some aspects, the animal safety constraint system 600 may assist in animal-specific functionality, such as milking cows, trimming a goat's hooves, or shearing sheep, llamas, or alpacas 660, or shoeing horses.

In some aspects, such as for larger animals, the base surface 650 may be anchored into the floor or foundation of a barn or building. In some embodiments, the base surface 650 may comprise the floor or foundation of a barn or building, and the torso support arm 635 may be anchored directly into the floor through the torso support surface mount 630. In some implementations, the base surface 650 may comprise a track, similar to that illustrated and described in FIG. 4A, which may allow for lateral adjustment of the torso support arm 635. In some aspects, the torso support arm 635 may be static and may allow for lateral movement of the torso support pad 640.

In some embodiments, the second surface 605 may comprise an overhead surface, such as a ceiling, rafter beam, or other overhead surfaces, wherein the arm extender 611 may hang down from the second surface 605. In some implementations, the arm extender 611 may be on a track mechanism, similar to that illustrated and described in FIG. 4A. In some embodiments, similar to that illustrated in FIGS. 5A-5C, the neck clamp arm 615 may slide along the arm extender 611, which may allow for height adjustment for different sized animals.

In some aspects, the second surface may comprise a surface located proximate to the base surface 650, such as a wall. In some embodiments, the neck clamp arm 615 may be directly anchored into the second surface, such a directly into a wall. In some implementations, the second surface may comprise one or more tracks, which may allow for size adjustment based on the dimensions of the animal.

Figure 7A:
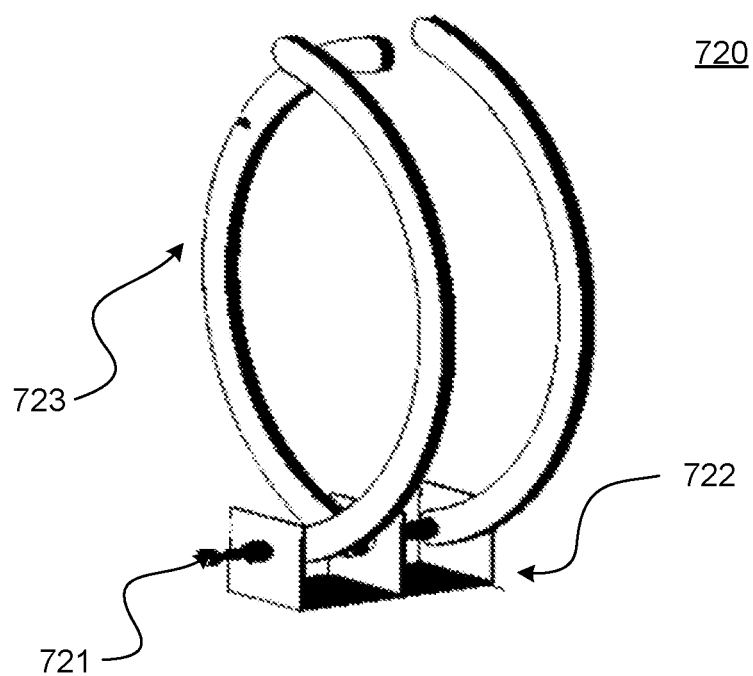
FIG. 7A illustrates a perspective view of an exemplary neck clamp for use with an animal safety constraint system, according to some embodiments of the present disclosure.
Figure 7B:
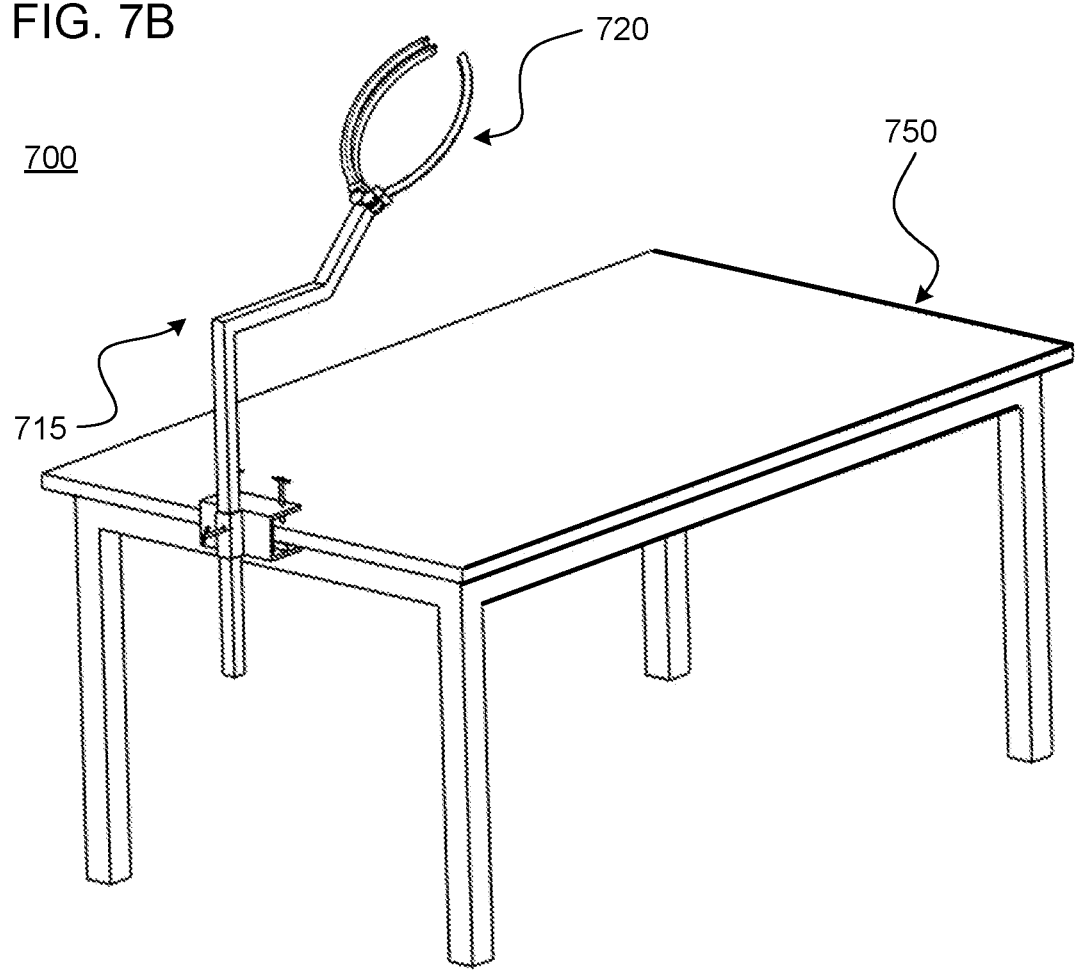
FIG. 7B illustrates a perspective view of an exemplary animal safety constraint system, according to some embodiments of the present disclosure.

Referring now to FIG. 7A, a perspective view of an exemplary neck clamp for use with an animal safety constraint system is illustrated. In some embodiments, the neck clamp 720 may comprise a plurality of arc portions 723, wherein a combination of at least two of the arc portions is configured to wrap around the neck of an animal. In some implementations, the neck clamp 720 may comprise a base 722 that may attach to a neck clamp arm, such as illustrated in FIG. 7B. In some embodiments, the plurality of arc portions 723 may attach to the base 722 through a shaft 721 and secured, such as by a cap, screw, or washer, as non-limiting examples. In some aspects, the arc portions 723 may pivot around the shaft 721, either directly or indirectly through a secondary connector.

In some embodiments, the shaft 721 may control the positions of the arc portions 723. In some aspects, a safety release mechanism may interface with the shaft 721 and arc portions 723. For example, the safety release mechanism may cause a release of the arc portions 723 from around the neck of an animal. In some aspects, the threshold conditions for activation of the safety release mechanism may relate to parameters of the neck clamp 720, such as tightness of the arc portions 723 around an animal's neck. In some implementations, the neck clamp 720 may comprise biofeedback sensors, which may monitor or detect physical conditions of the animal, such as blood pressure, heartrate, or temperature, as non-limiting examples.

Referring now to FIG. 7B, a perspective view of an animal safety constraint system 700 is illustrated. In some aspects, the animal safety constraint system 700 may comprise a neck clamp 720 and a neck clamp arm 715, wherein the neck clamp arm 715 may be connectable to a base surface 750. In some embodiments, the neck clamp 720 may comprise a plurality of arc portions, wherein a combination of at least two of the arc portions is configured to wrap around the neck of an animal, wherein wrapping may secure the neck of the animal within the animal safety constraint system 700 and safely constrains the animal to stay on the base surface 750.

Figure 8A:
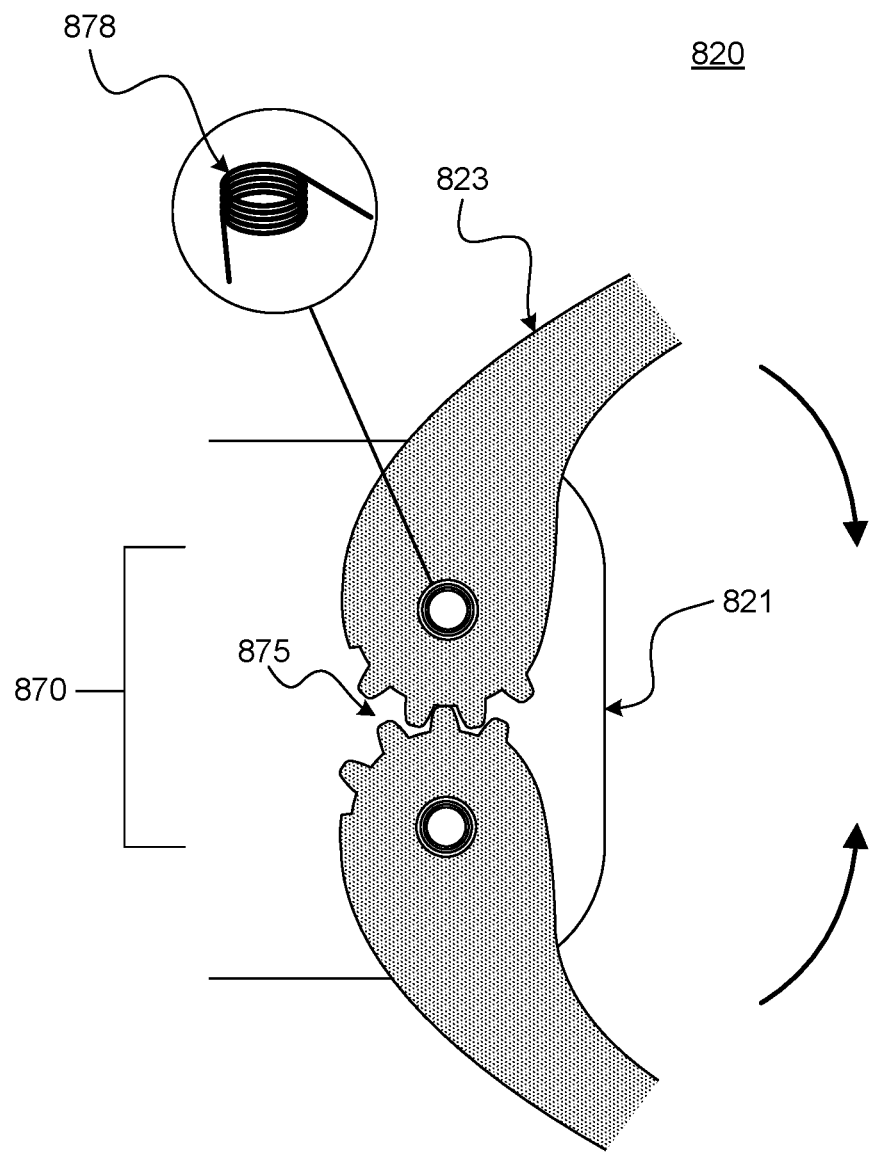
FIG. 8A illustrates a perspective view of an exemplary neck clamp for use with an animal safety constraint system, according to some embodiments of the present disclosure.
Figure 8B:
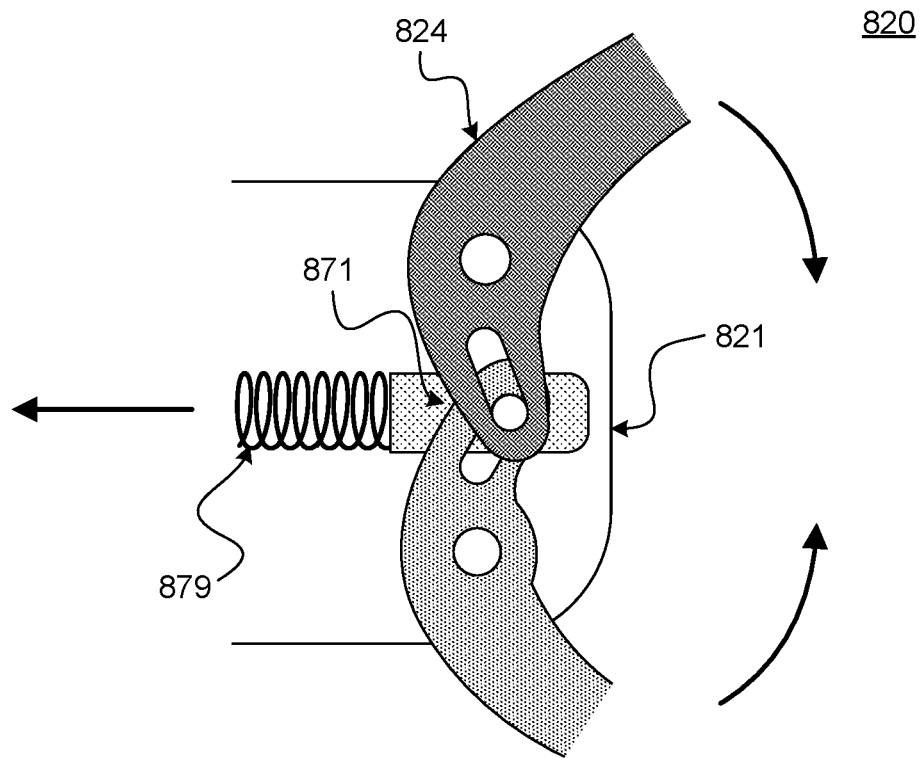
FIG. 8B illustrates a perspective view of an exemplary animal safety constraint system, according to some embodiments of the present disclosure.
Figure 8C:
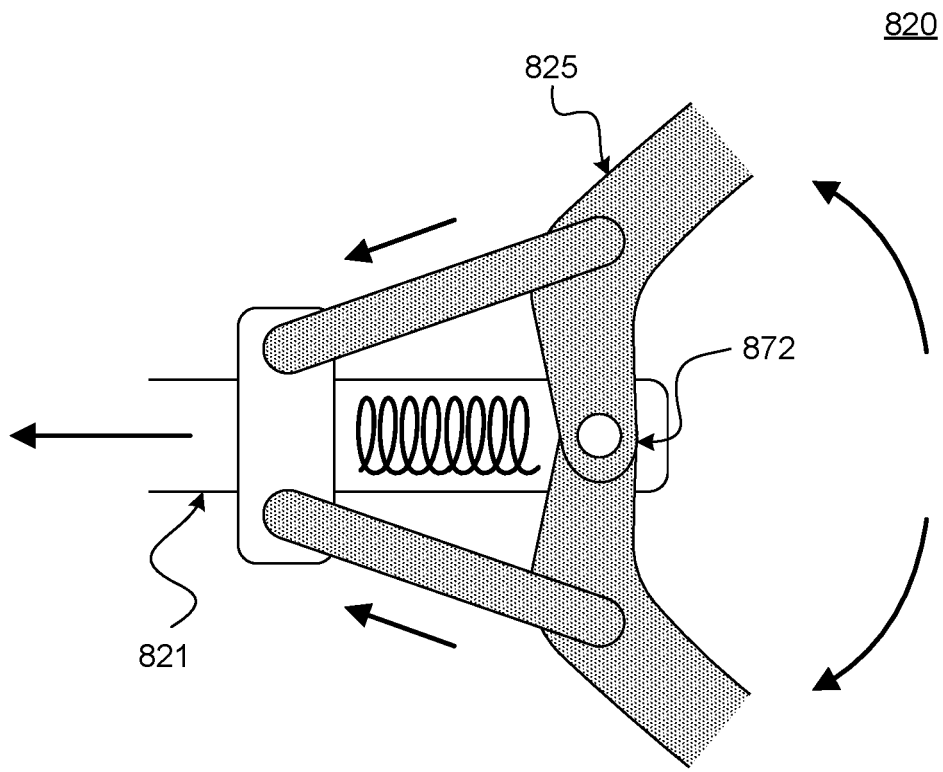
FIG. 8C illustrates a perspective view of an exemplary animal safety constraint system, according to some embodiments of the present disclosure.

Referring now to FIGS. 8A-C, an exemplary neck clamp 820 for use with an animal safety constraint system is illustrated. In some embodiments, the neck clamp 820 may comprise a shaft 821. In some implementations, the neck clamp 820 may comprise one or more arc portions 823. In some aspects, the neck clamp 820 may comprise a positioning mechanism 870, 871, 872.

In some embodiments, the arc portions 823 may comprise the positioning mechanism 870. In some implementations, the arc portions 823 may interface via the shaft 821. In some aspects, the positioning mechanism 870 may comprise geared portions of the arc portions 823. In some implementations, the geared portions of the arc portions 823 may interface with each other.

As an illustrative example, the geared portions of two arc positions 823 may interface with each other to provide predetermined positions for the positioning mechanism 870. In some aspects, the positioning mechanism 870 may comprise a retention force mechanism, such as a torsional spring 878, to maintain the predetermined position of the positioning mechanism 870. In some embodiments, the ratchet surface 875 may comprise a plurality of slots. In some implementations, the slots may be conjoined by a shared anchor that allows the slots to move in conjunction. In some aspects, the positioning mechanism 871 may comprise components internal to the shaft 821, such as a spring 879.

As an illustrative example, the ends of two arc portions 824 may comprise ratchet surfaces 875 that connect via an extrusion on the shaft 821. A spring 879 may provide tension to the ratchet surfaces 875, retaining the fixed positions of the arc portions 824 in an open or closed state. As the tension force of the spring 879 is overcome, the ratchet surfaces 875 may slide along the shaft 821 extrusion, thereby transitioning the arc portions 824 from an open state to a closed state. The spring 879 may exert force on the arc portions 824 sufficient to maintain a closed state, due to a lower requirement of retention force.

In some embodiments, the adjustment mechanism 872 may comprise external components that interface with the shaft 821. For example, the adjustment mechanism 872 may comprise a spring-loaded collar that fits around the shaft 821 and provides a retention force for keeping the arc portions 825 in a predetermined position as they close around a dog's neck.

Figure 9A:
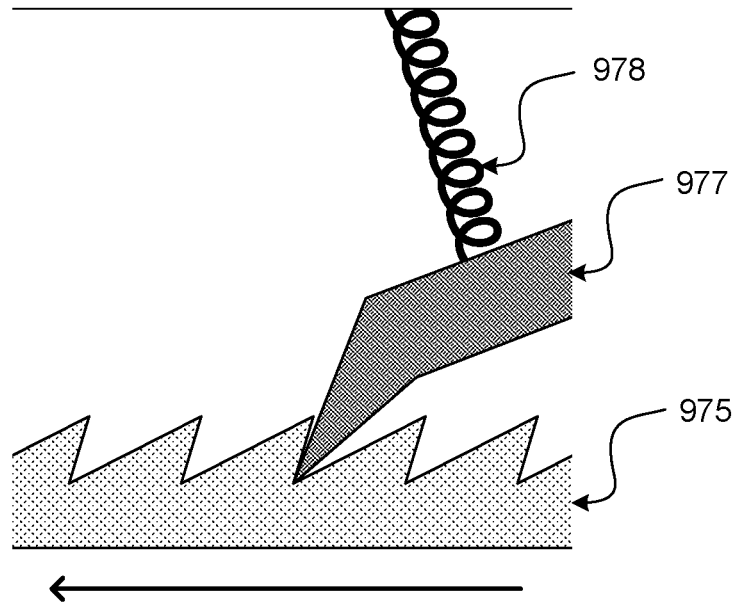
FIG. 9A illustrates a perspective view of an exemplary neck clamp for use with an animal safety constraint system, according to some embodiments of the present disclosure.
Figure 9B:
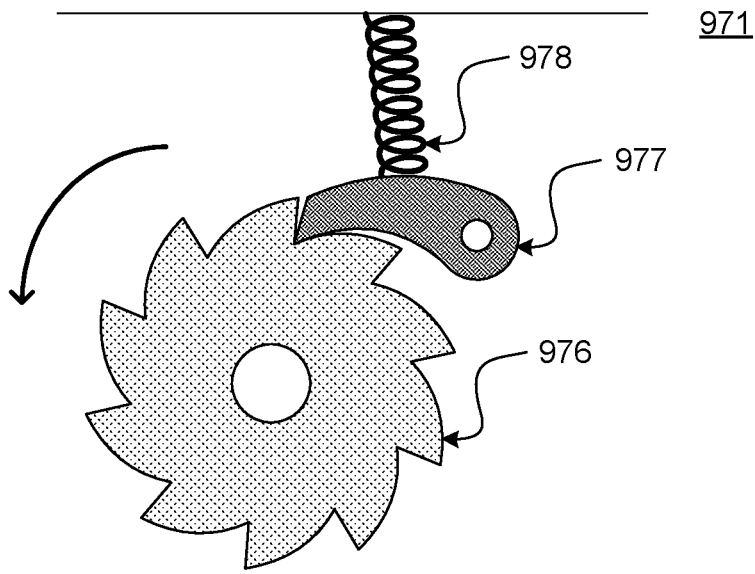
FIG. 9B illustrates a perspective view of an exemplary animal safety constraint system, according to some embodiments of the present disclosure.

Referring now to FIGS. 9A-B, a perspective view of an exemplary positioning mechanism 970, 971 for use with an animal safety constraint system is illustrated. In some embodiments, the positioning mechanism 970, 971 may comprise a ratchet system such as a spring 978 attached to a pawl 977 that retains a fixed position on a ratchet surface 975 comprising a plurality of evenly spaced extruded portions.

In some implementations, the ratchet surface 975 may extend along a plane and transverse in a linear manner. For example, the pawl 977 may slide along the ratchet surface 975 as it moves from right to left. This movement may cause the neck clamp to tighten. In some aspects, the ratchet surface 976 of the positioning mechanism 971 may be rotational. In some embodiments, the pawl 975 may provide the retention force necessary to maintain the fixed position of the neck clamp.

Figure 10A:
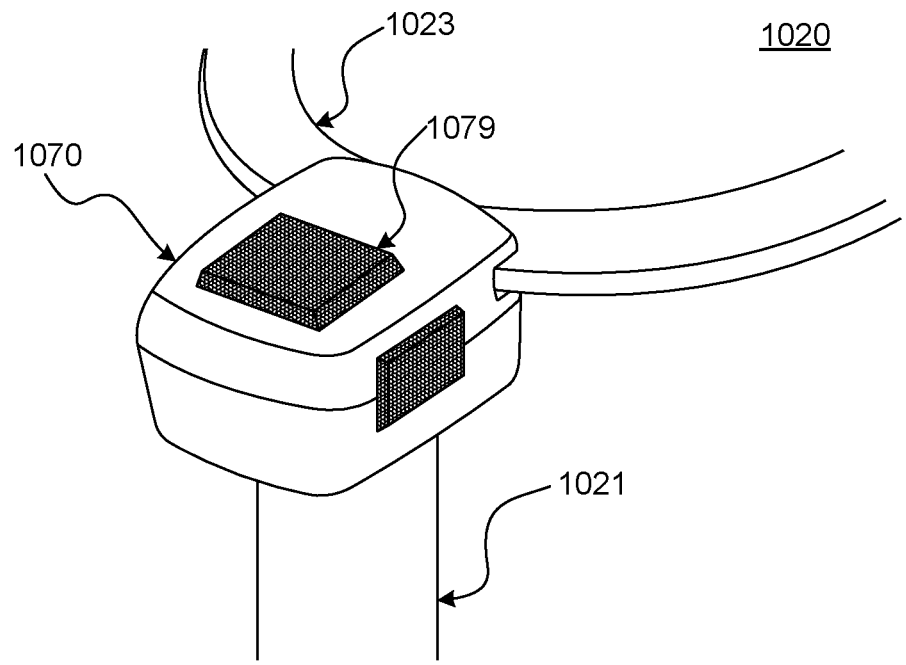
FIG. 10A illustrates a perspective view of an exemplary neck clamp for use with an animal safety constraint system, according to some embodiments of the present disclosure.
Figure 10B:
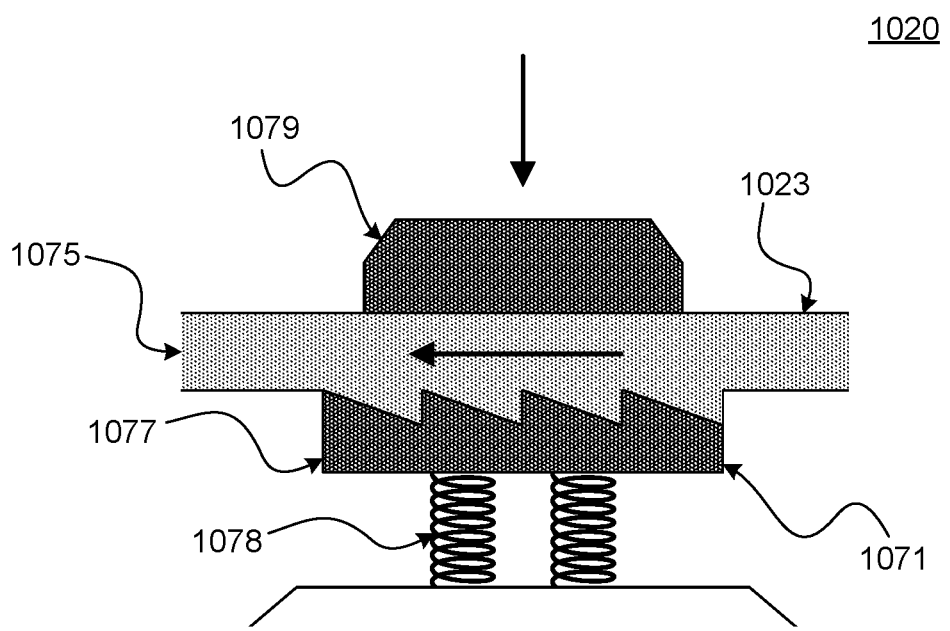
FIG. 10B illustrates a perspective view of an exemplary animal safety constraint system, according to some embodiments of the present disclosure.

Referring now to FIGS. 10A-B, a perspective view of an exemplary neck clamp 1020 for use with an animal safety constraint system is illustrated. In some embodiments, the neck clamp may comprise arc portions 1023. In some implementations, the neck clamp may comprise a positioning mechanism 1070, 1071 that may interface with the arc positions 1023 where they meet at the shaft 1021. In some embodiments, the positioning mechanism 1070, 1071 may comprise a spring 1078 attached to a pawl 1077 that retains a fixed position on a ratchet surface 1075 with a plurality of evenly spaced extruded portions.

In some implementations, the ratchet surface 1075 may extend along a plane and transverse in a linear manner. For example, the pawl 1077 may remain stationary while the ratchet surface 1075 moves from right to left. This movement may cause the neck clamp to tighten. In some aspects, the pawl 1077 may remain stationary by disengaging from contact with the ratchet surface.

In some embodiments, the positioning mechanism may comprise a release mechanism 1079, such as a button, that may be compressed to disengage the pawl 1077 from the ratchet surface 1075, thereby allowing for tightening and loosening the neck clamp via horizontal translation of the ratchet surface 1075. In some aspects, the release mechanism 1079 may release automatically when triggered by information received by the biofeedback sensor.

Figure 11A:
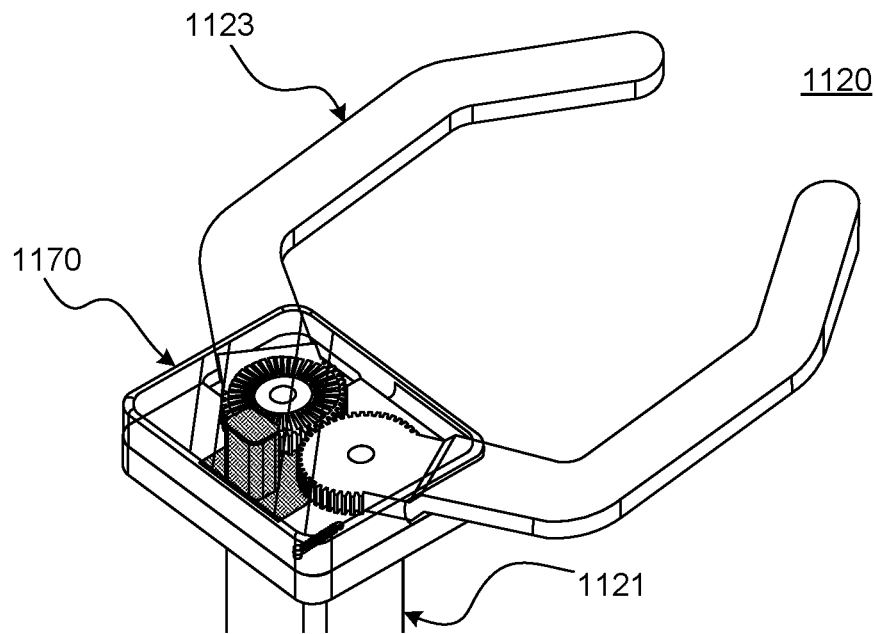
FIG. 11A illustrates a perspective view of an exemplary neck clamp for use with an animal safety constraint system, according to some embodiments of the present disclosure.
Figure 11B:
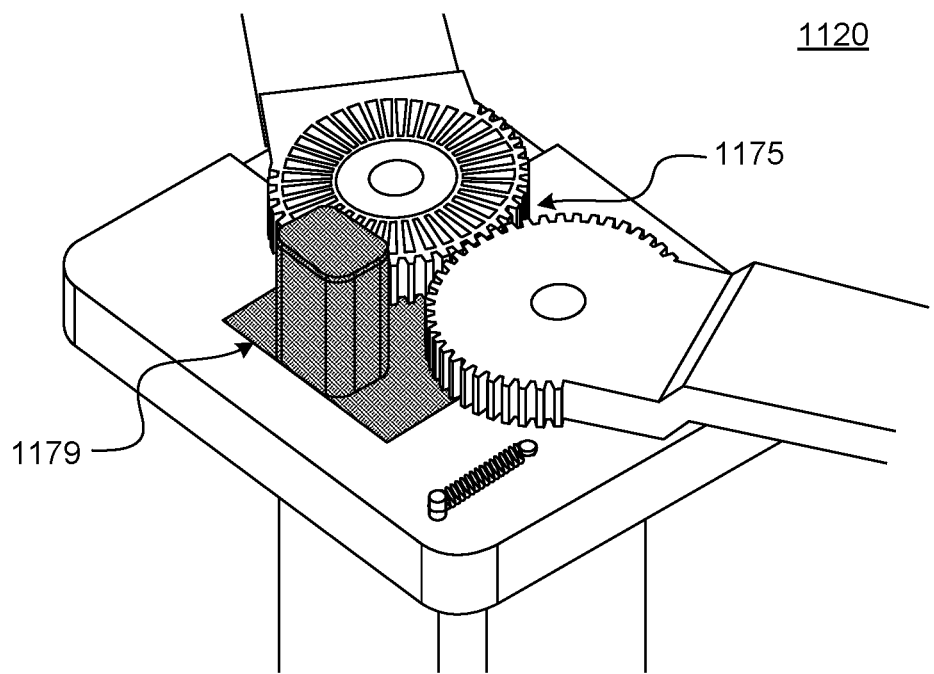
FIG. 11B illustrates a perspective view of an exemplary animal safety constraint system, according to some embodiments of the present disclosure.
Figure 11C:
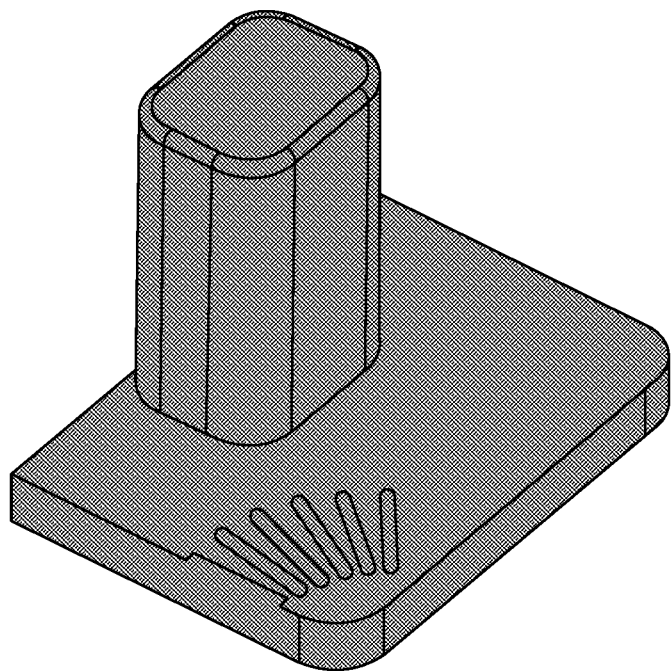
FIG. 11C illustrates a perspective view of an exemplary neck clamp for use with an animal safety constraint system, according to some embodiments of the present disclosure.

Referring now to FIGS. 11A-C, an exemplary neck clamp 1120 for use with an animal safety constraint system is illustrated. In some embodiments, the neck clamp 1120 may comprise a shaft 1121. In some implementations, the neck clamp 1120 may comprise one or more arc portions 1123. In some aspects, the neck clamp 1120 may comprise a positioning mechanism 1170.

In some embodiments, the arc portions 1123 may comprise the positioning mechanism 1170. In some implementations, the arc portions 1123 may interface via the shaft 1121. In some aspects, the positioning mechanism 1170 may comprise geared portions of the arc portions 1123. In some implementations, the geared portions of the arc portions 1123 may interface with each other.

As an illustrative example, the geared portions of two arc positions 1123 may interface with each other to provide predetermined positions for the positioning mechanism 1170. In some aspects, the positioning mechanism 1170 may comprise a retention force mechanism, such as a torsional spring, to maintain the predetermined position of the positioning mechanism 1170.

As an illustrative example, the ends of two arc portions 1123 may comprise ratchet surfaces 1175 that connect via an extrusion on the shaft 1121. A spring may provide tension to the ratchet surfaces 1175, retaining the fixed positions of the arc portions 1123 in an open or closed state. As the tension force of the spring is overcome, the ratchet surfaces 1175 may slide along the shaft 1121 extrusion, thereby transitioning the arc portions 1123 from an open state to a closed state. The spring may exert force on the arc portions 1123 sufficient to maintain a closed state, due to a lower requirement of retention force.

In some embodiments, the positioning mechanism 1170 may comprise a release mechanism 1179, such as a button, that may be compressed to disengage the ratchet surface 1175, thereby allowing for tightening and loosening the neck clamp via rotation of the ratchet surface 1175. In some implementations, the release mechanism 1179 may comprise a plurality of extrusions that interface with the ratchet surface 1175, providing fixed positions for securing the neck clamp in predetermined open and closed states. In some aspects, the release mechanism 1179 may release automatically when triggered by information received by the biofeedback sensor.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. An animal safety constraint system comprising:
a neck clamp comprising:
   a plurality of rigid appendages comprising at least two arc portions, wherein a combination of at least two of the plurality of rigid appendages is configured to wrap around a neck of an animal,
   a positioning mechanism further comprising:
     at least one ratchet surface, wherein the at least one ratchet surface provides a plurality of predetermined positions for the at least two arc portions,
   a neck clamp base connected to at least a portion of the plurality of rigid appendages, wherein a first of the at least two arc portions extends in a first direction from the neck clamp base and a second of the at least two arc portions extends in a second direction from the neck clamp base;
a neck clamp arm connected to the neck clamp and connectable to a base surface and the neck clamp base, wherein the base surface is configured to provide a platform for the animal;

one or more safety release mechanisms configured to release at least a portion of the plurality of rigid appendages, wherein releasing releases the animal constrained within the animal safety constraint system, and wherein the releasing triggers disengagement of the at least one ratchet surface from one or more extrusions configured upon at least one portion of each of the one or more safety release mechanisms and is based on one or more threshold activities, wherein at least one of the one or more threshold activities comprises the animal slipping or falling off the base surface;
a torso support pad configured to accept a torso of the animal; and
a torso support arm connected to the torso support pad and connectable to the base surface, wherein the neck clamp and the torso support pad are configured to safely constrain the animal within the animal safety constraint system to stay on the base surface; and
a biofeedback sensor located on one or both the neck clamp and the torso support pad, wherein at least one of the one or more threshold activities are detected through the biofeedback sensor.

2. The animal safety constraint system of claim 1, wherein the at least one ratchet surface disengages from a predetermined position automatically from information received from the biofeedback sensor.

3. The animal safety constraint system of claim 1, wherein one or both the neck clamp and the torso support pad are lined with a soft material configured to increase comfort for the animal when constrained within the animal safety constraint system.

4. The animal safety constraint system of claim 1, wherein the neck clamp arm comprises an angle adjustment mechanism configured to allow for control over an angle of extension within the neck clamp arm.

5. The animal safety constraint system of claim 1, further comprising a neck clamp surface mount configured to connect the neck clamp arm to the base surface.

6. The animal safety constraint system of claim 5, wherein the neck clamp surface mount comprises a first adjusting mechanism adjustable to accommodate a predefined range of animal sizes.

7. The animal safety constraint system of claim 6, wherein the first adjusting mechanism is electronically adjustable.

8. The animal safety constraint system of claim 1, further comprising a torso support surface mount configured to connect the torso support arm to the base surface.

9. The animal safety constraint system of claim 8, wherein the torso support surface mount comprises a second adjusting mechanism adjustable to accommodate a predefined range of animal sizes.

10. The animal safety constraint system of claim 9, wherein the second adjusting mechanism is electronically adjustable.

11. The animal safety constraint system of claim 1, wherein at least one of the one or more safety release mechanisms releases the neck clamp.

12. An animal safety constraint system comprising:
a base surface configured to provide a platform for an animal;
a neck clamp configured to accept a neck of the animal, wherein at least a portion of the neck clamp comprises at least one ratchet surface;
a neck clamp arm connected to the neck clamp and connectable to the base surface;
one or more safety release mechanisms, wherein at least a portion of each of the one or more safety release mechanisms comprises one or more extrusions configured to engage at least one portion of the at least one ratchet surface to releasably secure one or more portions of the neck clamp at one or more predetermined positions, wherein each of the one or more safety release mechanisms is configured to be actuated to disengage the at least one ratchet surface from the one or more extrusions;
a torso support pad configured to accept a torso of the animal; and
a torso support arm connected to the torso support pad and connectable to the base surface, wherein the neck clamp and the torso support pad are configured to safely constrain the animal within the animal safety constraint system to stay on the base surface.

13. The animal safety constraint system of claim 12, wherein at least one of the one or more safety release mechanisms releases the neck clamp.

14. An animal safety constraint system comprising:
a base surface configured to provide a platform for an animal;
a neck clamp configured to accept a neck of the animal, wherein the neck clamp comprises:
a plurality of rigid appendages comprising at least two arc portions, wherein a combination of at least two of the plurality of rigid appendages is configured to wrap around a neck of an animal and secure via a positioning mechanism,
a neck clamp base connected to at least a portion of the plurality of rigid appendages, wherein a first of the at least two arc portions extends in a first direction from the neck clamp base and a second of the at least two arc portions extends in a second direction from the neck clamp base, wherein the first and the second of the at least two arc portions each comprises a proximal end that at least partially comprises a ratchet surface;
a neck clamp arm connected to the neck clamp and connectable to the base surface and the neck clamp base;
one or more safety release mechanisms configured to release at least a portion of the plurality of rigid appendages, wherein releasing disengages the ratchet surfaces from one or more extrusions configured upon at least one portion of each of the one or more safety release mechanisms and releases the animal constrained within the animal safety constraint system, and wherein the releasing is based on one or more threshold activities, wherein at least one of the one or more threshold activities comprises the animal slipping or falling off the base surface;
a torso support pad configured to accept a torso of the animal; and
a torso support arm connected to the torso support pad and connectable to the base surface, wherein the neck clamp and the torso support pad are configured to safely constrain the animal within the animal safety constraint system to stay on the base surface; and
a biofeedback sensor located on one or both the neck clamp and the torso support pad, wherein at least one of the one or more threshold activities are detected through the biofeedback sensor.

15. The animal safety constraint system of claim 5, wherein one or both the neck clamp arm and the neck clamp are adjustable to accommodate a predefined range of animal sizes.

16. The animal safety constraint system of claim 5, wherein the base surface comprises a plurality of sizes, and wherein the neck clamp arm is adaptable to connect to the plurality of sizes.

17. The animal safety constraint system of claim 1, wherein a first portion of the plurality of rigid appendages fits into a second portion of the plurality of rigid appendages.

18. The animal safety constraint system of claim 11, wherein a first portion of the plurality of rigid appendages fits into a second portion of the plurality of rigid appendages.

19. The animal safety constraint system of claim 1, wherein the positioning mechanism further comprises at least one torsional spring configured to at least temporarily maintain each of the plurality of predetermined positions for the at least two arc portions, wherein the at least one torsional spring is configured within an aperture proximate to a proximal end of each of the first and the second of the at least two arc portions.

* * * * *